March 6, 1962    A. EMERSON, JR    3,023,539
INSECT TRAP
Filed Aug. 15, 1960

INVENTOR
ALFRED EMERSON JR.
BY Richard J. Rowling
ATTORNEY 3,023,539
INSECT TRAP
Alfred Emerson, Jr., Palisades Park, N.J.
(333 W. 57th St., New York 19, N.Y.)
Filed Aug. 15, 1960, Ser. No. 49,676
8 Claims. (Cl. 43—113)

The present invention relates generally to an insect trap of the type which employes a sticky or adhesive material to catch and hold flies or other insects, and it has particular relation to an insect trap employing a light to attract insects and a throw-away catching unit wherein the adhesive material is at all times protected from accidental contact by anyone handling the same.

Heretofore, there have been many kinds of insect traps utilizing a sticky or adhesive material wherein the same was protected from contact from anyone handling the same, but in each of these traps the entire unit had to be discarded or cleaned for reuse. There are also many kinds of insect traps using a light to attract the insects in combination with a sticky or adhesive material to catch and hold them, but in each of these kinds of traps they either had to be cleaned and new adhesive applied or, if the sticky material was to be discarded and replaced, the same was utilized in such a way that careful handling was required to prevent anyone from contacting the sticky adhesive portion thereof.

The present invention obviates all of disadvantages of the aforementioned prior art insect traps. There is no chance of anyone coming into contact with the adhesive material while handling the trap, the adhesive material is contained within a throw-away unit that is replaceable, eliminating the necessity of cleaning, and the light portion of the unit is free from contamination.

An object of the invention is to provide an efficient, sanitary and economical insect trap having a throw-away unit that is easily and quickly replaceable.

Another object of the invention is the provision of a readily separable unit containing the sticky or adhesive substance which can be used independently of the light attracting unit when desired.

A further object of the invention is to provide a unit containing a protected sticky or adhesive substance in which additional attractive foods may be added as desired, depending upon the nature of the insects to be attracted.

Figure 1:
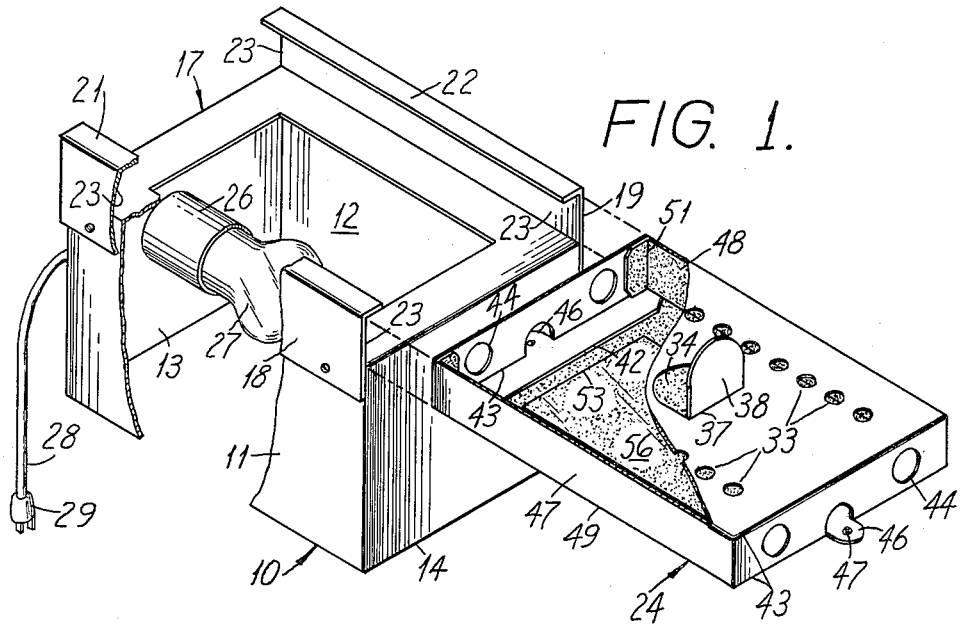
Figure 2:
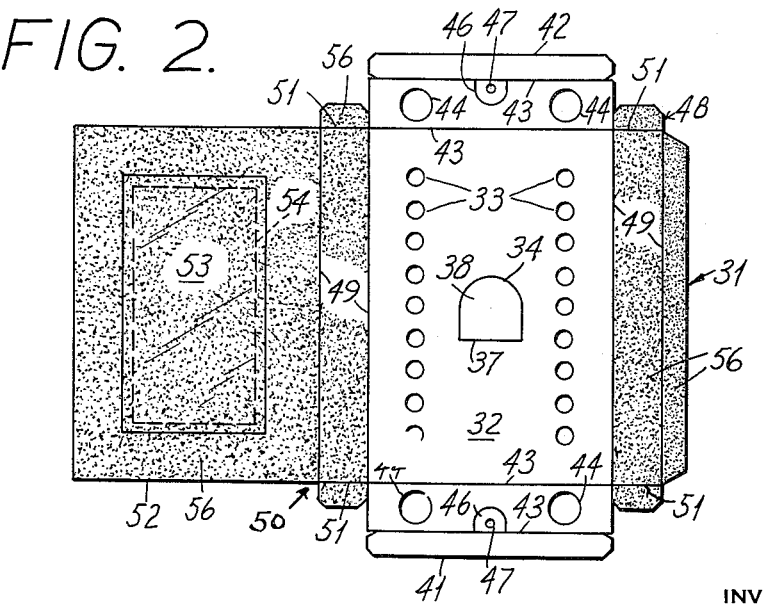

Other and further object and advantages of the invention reside in the detailed construction of its separable parts, which result in simplicity, economy and efficiency, and which will be readily apparent from the following detailed description, wherein a preferred form of embodiment is shown, reference being had to the accompanying drawings, forming a part hereof, wherein like numerals indicate like parts, in which:

FIGURE 1 is a fragmentary exploded view of an insect trap embodying the principles of the invention; and FIGURE 2 is a top plan view of the blank which forms the removable unit, showing its scoring and its adhesive covered areas.

Referring now to the drawings, and particularly to FIGURE 1, there is shown a frame structure 10, consisting of metal, wood, plastic or other suitable material, having two sides 11 and 12 and two ends 13 and 14, and which is open at its bottom and top. The top edges of the sides 11 and 12 and the ends 13 and 14 are bent inwardly and form supporting platform 17. The two sides 11 and 12 have extensions 18 and 19 rising above the platform 17, whose upper edges 21 and 22 are bent inwardly in spaced parallel relation with the corresponding sections of the platform 17. The inward extensions 21 and 22 which extend in parallel relation with the corresponding sections of the platform 17 form a trackway 23 for receiving slidably a receptable 24 hereinafter to be described in detail.

Mounted through one end of the frame structure 10 is a conventional electric light socket 26, having a bulb 27. An electric cord 28, having a plug 29, extends outwardly of the frame structure 10, whereby the light bulb 28 may be connected with a source of electrical energy (not shown).

Referring now to FIGURE 2, there is shown in detail the finished blank 31 from which the receptacle 24 is formed. The blank 31 consists of a single sheet of flexible material, such as paper, plastic or any other suitable and inexpensive material of the type which can be cut, scored and folded in continuous-in-line assembly on an automatic box making machine to form a closed rectangular receptacle capable of being slidably mounted over the open top of the frame structure 10 to close the same by fitting it into the trackway 23.

The blank 31 has a main portion 32, which constitutes its top, which is provided with a series of small spaced apertures 33 adapted to provide entrances for insects (not shown). This main portion 32 also has a relatively large opening 34 as compared to the apertures 33, which is cut out of the blank 31 except for a segmental section 37, which is scored and forms a hinged closure 38 therefor. The blank 31 has end portions 41 and 42 extending outwardly therefrom to constitute when transversely double scored and folded, as indicated at 43 double end portions, which form the ends of the closed receptacle 24. It will be noted that each of the end portions 41 and 42 continguous to said main portion 32 have spaced apertures 44 therethrough, and that said end portions also have a hinged cut-out 46 which, in turn, is provided with an aperture 47 centrally thereof. The aperture 47 of the cut-out 46 provides means to facilitate mounting the same on a wall or other surface by hanging it by means of a nail, thumb-tack or other device, which is passed therethrough.

The two side portions 48 and 50 are scored longitudinally, as indicated at 49, and transversely, as indicated at 51, to provide side closure flaps for the receptacle 24. One of said side portions, which in the drawings is the side portion 50, has an enlarged outer panel 52, which corresponds in size and shape to the main portion 32 and provides a bottom for the receptacle 24. This enlarged outer panel 52 contains a window 53, which may be made of a flexible sheet of any suitable transparent and/or translucent material, as for example, cellophane or other suitable inexpensive plastic material. The window 53 is slightly larger in size than the opening it is intended to cover, and it is fastened securely to the panel 52 by adhesive to the overlapping areas, as indicated by the numeral 54.

It will be noted in FIGURE 2 that the outer panel 52, its window 53 and the side portions 48 and 50, which constitute the side closure flaps for the receptacle 24, are covered with an adhesive coating 56 of any suitable material that is attractive to and capable of holding insects contacting the same.

By the term insect, it is not intended that the same be limited to such as gnats, flies and mosquitos, but it is to be understood that any undesirable creature is to be embraced therein capable of being caught and held by the adhesive material used. The opening 34, which has a hinged top closure 38, permits ready access to the interior of the closed and assembled receptacle 24 when additional bait is required to attract certain animals or insects not normally inquisitive as to a source of light. As for example, a sweetener for ants, cheese for mice, etc.

In the operation of the trap, the basic frame structure 10 is positioned in any desirable place on any suitable type of supporting platform, as for example, the ground, a floor, a table, etc., and its light cord 28 with its plug 29 is connected to a conventional source of electrical energy. The closed receptacle 24 is positioned over the top of the frame structure 10 by sliding the same in the trackway 23. Of course, any other form of attachment may be substituted for the trackway 23 as long as the receptacle is mounted securely but removably on the frame structure 10.

The light from the bulb 27 will shine through the window 53 into the inside of the receptacle 24 and pass out through the spaced openings 33, 34, 44 and 46, thereby attracting insects curious to a light source. Any insects entering through these openings or entrances will eventually contact the adhesive material 56 within the closed receptacle 24 and will be caught and held thereby to die. Obviously, when the receptacle 24 has been used sufficiently to warrant its disposal, it is inexpensive enough to be thrown away or burned. Thereupon, a new receptacle 24 may be substituted for the old receptacle. This may be accomplished with great ease and efficiency.

It will also be obvious that the use of the receptacle 24 is not necessarily limited to use with the frame structure 10, wherein a source of light is required as the attractive means. It may be used separately in the day time without a light in which case some sort of bait would be required to attract the insects to be caught. Accordingly, the closed receptacle 24 is provided with an enlarged opening 34, having a hinged lid 38, through which such additional bait may be added as desired. There will frequently be times when it will be inconvenient to lay the closed receptacle 24 on a horizontal supporting surface, such as the ground, a floor, table, etc. Therefore, there is provided centrally in each end portion 41 and 42 a hinged cutout 46, having an aperture 47 therethrough, which provides facilities for hanging the same on a nail or tacking the same to a wall or other non-horizontal supporting surface.

Although only one modification of the invention has been shown and described in detail, it will be readily apparent to those skilled in the art that the invention is not so limited, but that various other modifications may be made therein without departing from the spirit thereof or from the scope of the appended claims.

What I claim is:

1. In a device of the character described, a frame structure open at its top and bottom, means adjacent said open top for receiving removably a replaceable unit, a light mounted within said frame structure, and a removable closure member for said frame structure positioned in said receiving means comprising a closed receptacle having a window in its bottom, a series of spaced apertures through its top, and a layer of adhesive material covering the inside surfaces of said closure bottom.

2. In a device of the character described, an open top frame structure, means on said frame structure for receiving removably a replaceable unit, a light mounted within said frame structure, and a removable closure member for said frame structure positioned in said receiving means comprising a closed receptacle having a bottom containing a window, a series of spaced apertures in its top through which insects may enter that are attracted by said light, a second series of spaced apertures in its opposite ends for insects to enter that are attracted by said light, and a layer of adhesive material covering the inside surfaces of said closure bottom and opposite sides.

3. In a device of the character described, an open top frame structure, means on said frame structure for receiving removably a replaceable unit, a light mounted within said frame structure, and a removable closure member for said frame structure positioned in said receiving means comprising a closed receptacle having a bottom containing a window, a series of spaced apertures in its top through which insects may enter that are attracted by said light, a second series of spaced apertures in its opposite ends for insects to enter that are attracted by said light, said ends having an opening provided with a hinged closure member which when projected outwardly will form a tab by which the receptacle may be suspended, and a layer of adhesive material covering the inside surfaces of said closure bottom and its opposite sides.

4. In a device of the character described, a frame structure open at its top and bottom, a light mounted within said frame structure having a cord for connecting with a source of electrical energy, and a throw-away closed receptacle adapted to fit removably on said frame structure, said receptacle having a bottom containing a window and a top that has a series of spaced apertures therethrough, said receptacle having the inside surfaces of said bottom and sides coated with a sticky adhesive adapted to catch and hold insects coming into contact with the same.

5. In a device of the character described, a frame structure open at its top and bottom, a light mounted within said frame structure having a cord extending through one of its sides for connecting with a source of electrical energy, and a closure member adapted to be mounted slidably over said frame structure, said closure member comprising a closed throw-away receptacle having a bottom containing a window and a top having a series of spaced holes, said top having an enlarged opening therein having a hinged closure member whereby bait may be inserted inside said receptacle, said inner surfaces of said bottom and sides of said receptacle being coated with an adhesive substance capable of catching and holding insects coming into contact with the same.

6. In a device of the character described, a rectangular frame structure, said frame structure having its upper edges turned inwardly to provide a perimetrical horizontal support, two of the opposite sides of said frame structure having upward extensions with inwardly extending flanges which with said perimetrical support form a trackway for receiving slidably a top closure member, said top closure member consisting of a throw-away closed receptacle, said receptacle having a base containing a window, a top having a plurality of spaced apertures therethrough providing entrances for insects attracted by said light, said receptacle having ends which have spaced openings therein to provide additional entrances for insects attracted by said light, the inner surfaces of the closure bottom and sides, being coated with an adhesive substance capable of catching and holding insects contacting the same.

7. A throw-away closed receptacle comprising a top, bottom, two sides and two ends, said top having a series of relatively small apertures therethrough for the entrance of insects, said bottom having a window, said ends each having an opening with a hinged closure flap which when projected outwardly provide hanging tabs for said receptacle, said bottom having its inner surface covered with an adhesive material capable of cathing and holding insects contacting the same.

8. A throw-away closed receptacle comprising a top, bottom, two sides and two ends formed from a single scored and foldable blank, said top having a series of relatively small apertures therethrough for the entrance of insects, and a relatively large opening as compared to said apertures for adding bait to said receptacle, said large opening having a window, said ends having an opening in each end provided with hinged closure flaps which when projected outwardly provide hanging tabs for said receptacle, said bottom and sides being covered with an adhesive capable of catching and holding any insects contacting the same.

References Cited in the file of this patent

UNITED STATES PATENTS

| | | |
|---|---|---|
| 449,138 | Roth | Mar. 31, 1891 |
| 899,212 | Fiske | Sept. 22, 1908 |
| 1,021,874 | Labombarde | Apr. 2, 1912 |
| 1,182,389 | Levine | May 9, 1916 |